United States Patent [19]

Masclet

[11] 4,350,312
[45] Sep. 21, 1982

[54] FISHING REEL

[76] Inventor: Jean Masclet, 11 Boulevard Davout, 75020 Paris, France

[21] Appl. No.: 128,464

[22] Filed: Mar. 10, 1980

Related U.S. Application Data

[63] Continuation of Ser. No. 930,993, Aug. 4, 1978, abandoned.

[30] Foreign Application Priority Data

Aug. 5, 1977 [FR] France ............................. 77 24159

[51] Int. Cl.$^3$ ............................................. A01K 89/01
[52] U.S. Cl. ............................................. 242/84.2 G
[58] Field of Search .................... 242/84.2 G, 84.2 A, 242/84.21 A

[56] References Cited

U.S. PATENT DOCUMENTS

| | | | |
|---|---|---|---|
| 2,586,921 | 2/1952 | Delphon ...................... | 242/84.21 A |
| 3,370,806 | 2/1968 | Odom .............................. | 242/84.2 B |
| 3,743,207 | 7/1973 | McMickle ..................... | 242/84.21 A |

*Primary Examiner*—Billy S. Taylor
*Attorney, Agent, or Firm*—McAulay, Fields, Fisher, Goldstein & Nissen

[57] ABSTRACT

A single lever control operable with a single finger of the same hand holding the fishing reel and fishing pole. A mechanical double monostable toggle forming a single assembly for pivoting a line guide of the fishing reel. The line guide is received by its two ends in two supports, of which the first is displaceable rotatably and in translatory motion. The said single assembly of control means for pivoting the line guide comprises a control lever of which rotation in a first direction effects raising of the first support in order to cause pivoting of the line guide from the first to the second position, and of which rotation in a second direction effects rotation of the first support in order to cause pivoting of the line guide from the second to the first position.

9 Claims, 2 Drawing Figures

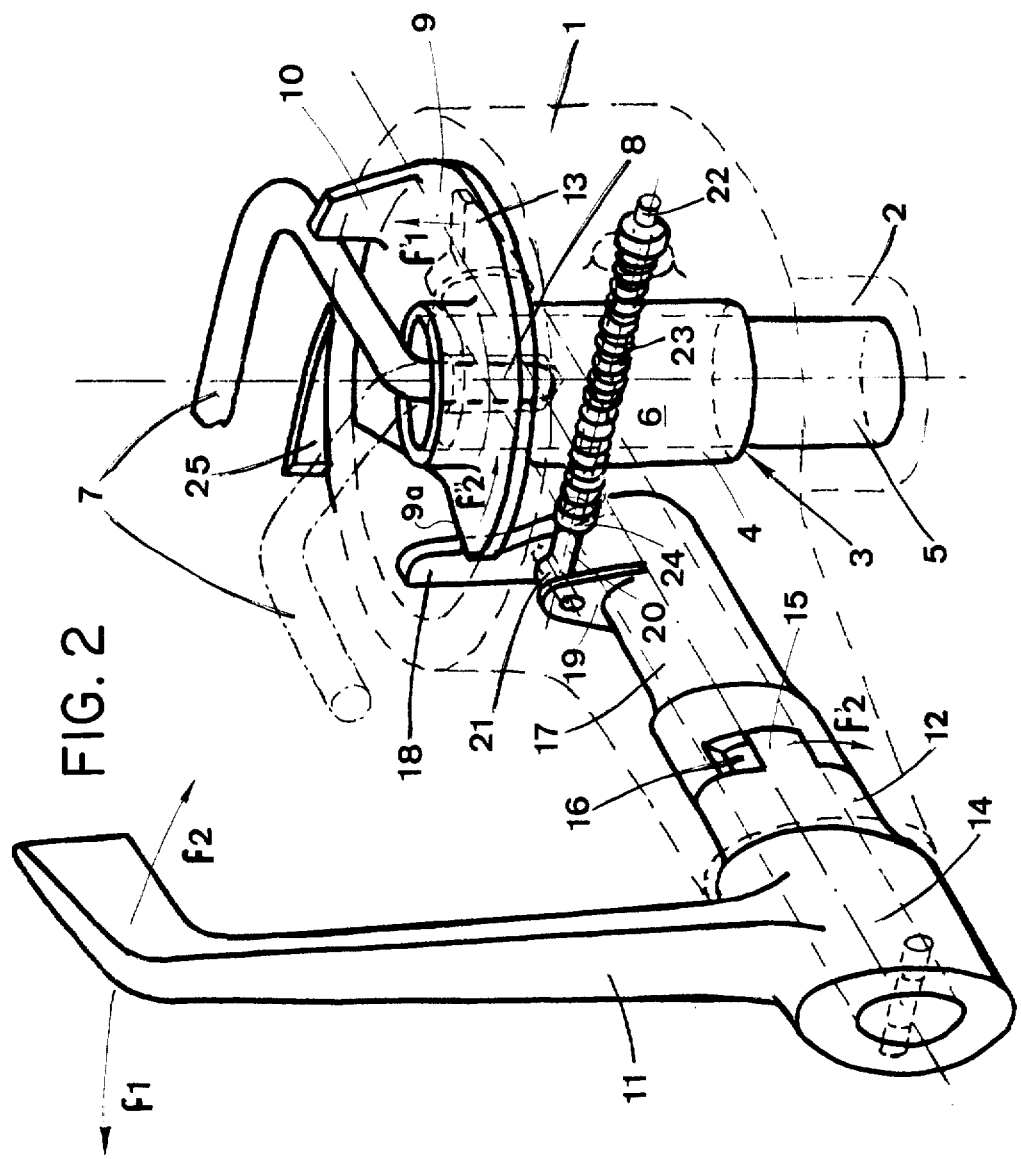

FISHING REEL

This is a continuation of application Ser. No. 930,993 filed Aug. 4, 1978, now abandoned.

CROSS-REFERENCES TO RELATED APPLICATIONS

This invention is an improvement of my earlier U.S. Patent Application Ser. No. 774,999, filed Mar. 7, 1977 for a revolving spool reel for casting, now U.S. Pat. No. 4,108,392.

BACKGROUND OF THE INVENTION

The aforementioned U.S. Pat. No. 4,108,392 describes a fishing reel comprising a body supporting a rotatable spool and spool driving means, a line guide pivoted about an axis fixed relative to the body, a first assembly including means for effecting pivoting of the line guide from a first position, permitting winding of the line on to the spool, to a second position, permitting unwinding of the line during casting, a second assembly including means for effecting pivoting of the line guide from the second to the first position, and means for transmitting a secondary movement to the spool ensuring suitable layering of the line on the spool.

In the embodiment more particularly described in the aforementioned patent, a frame is provided which is rotatable about a principal shaft, and a second shaft is rotationally connected to the principal shaft, the spool being operatively associated with one end of the secondary shaft, the secondary movement of the spool is also a rotational movement which is obtained by means of the frame which includes bearing means coupled with the other end of the secondary shaft and locates the secondary shaft at an angle of inclination relative to the principal shaft, and the frame holds the spool onto the secondary shaft inclined relatively to the principal shaft and rotationally connected to the latter.

The body of the reel supports means for driving of the spool which advantageously comprise a crank capable of rotating an auxiliary shaft carrying on the one hand one gear of a first pair of bevel gears of which the pinion is rotationally connected to the principal shaft and on the other hand the pinion of a second pair of bevel gears of which the other gear is rotationally connected to the rotary frame.

The reel likewise comprises a conventional type of line guide which is well known in prior reels. The line guide is received by its ends in two supports, of which the first is displaceable in both rotary and translatory motion. The line guide is pivotally mounted around an axis fixed with respect to the body of the reel and is pivotally movable from a first position which permits or enables the winding of the line onto the spool, to a second position which permits or allows the line to issue from the spool when casting. The line guide is also pivotally movable from the second to the first position, respectively by a first and a second assembly of means for effecting pivoting, each assembly being in the form of a mechanical monostable toggle, that is to say that after pivoting due to action of one of the assemblies, release or reoperation of this assembly does not modify the position of the line guide. Pivoting of the line guide in the opposite direction can only occur after operation of the other assembly, with the result that the handling of the reel is easier and more reliable.

More precisely, the first assembly of means for effecting pivoting comprises a first lever, rotation of which causes the first support to rise, causing the line guide to pivot from the first to the second position, and the second assembly of means for effecting pivoting comprises a second lever, rotation of which effects rotation of the first support so as to cause the line guide to pivot from the second to the first position. The two supports are substantially cylindrical and are each equipped with a slot. The first lever for effecting pivoting is rotationally connected with a rod carrying a lifter stud for the first support, at the periphery of which is arranged an abutment which holds the line guide in the first position.

The slot in the second support is bounded on one side by an inclined ramp, and operation of the first lever lifts the first support, bringing the corresponding end of the line guide beyond the abutment, so that, by virtue of the inherent resilience of the line guide, the latter is caused to slide along the ramp and to pivot from the first to the second position. The second lever is in turn rotationally connected to a shaft carrying a dog for driving a rack, counteracting resilient means such as a spring placed in the rack, the rack cooperating with teeth on the first support so as to rotate the latter. In addition, the first support contains a slot and a driving abutment defined at one end thereof, so that the operation of the second lever for effecting pivoting causes the driving abutment to rotate to bring the line guide from the second to the first position.

Finally, in a fully automatic embodiment, the reel according to the aforementioned Patent additionally comprises an electric motor coupled by way of a clutch device, or a free wheel, to the principal reel-rotating shaft. The electric motor is thus capable of causing the winding of the line onto the spool. In this embodiment, it is advantageous that the second assembly for effecting pivoting of the line guide also comprises the means for control of the electric motor, which may be a reversible motor, in such a manner that operation of the motor can be effected either in the line winding direction or in the unwinding direction by reversing the polarity of the electric motor.

Assuming that the line is reeled in and the line guide is in the winding position, when the user of a fishing rod equipped with a reel according to my earlier United States Patent wishes to cast, such user must pass the forefinger of the hand holding the rod beneath the first lever so that such user can then draw the latter towards the rod. This movement does not come naturally to the user: firstly, because it forces the user to move a bent forefinger away from the rod, so that the back of the forefinger does not hit either of the two pivoting levers, to extend it beneath the first lever, and then for the user to bring the extended forefinger back towards the rod; and secondly, because with conventional reels, after the line guide has been pivoted by the hand which does not hold the rod, casting is carried out with the movement of the forefinger, which is moved away from the rod to release the line previously pinched against the rod.

For these reasons, use of a reel according to the parent patent may in some instances give rise to some confusion between the movements, and/or some difficulty in the holding of the fishing rod prior to casting, which does not allow the user to cast with the customary precision obtained with conventional reels.

The present invention consequently proposes to overcome these disadvantages and, simultaneously, to simplify the construction of the assembly of means for controlling the pivoting of the line guide.

SUMMARY OF THE INVENTION

The invention accordingly provides a fishing reel of the type in my earlier U.S. Patent in which the first and second assemblies each of which includes means for pivoting the line guide are both formed as a single assembly constructed as a mechanical double monostable toggle.

In a preferred embodiment, the line guide is received by its two ends in two supports, of which the first is movable rotatably and with a translatory movement, and the single assembly according to the invention includes means for effecting pivoting of the line guide which comprises a control lever; the rotation of the control lever in a first direction effects raising of the first support in order to cause pivoting of the line guide from the first to the second position, and the rotation of the control lever in a second direction effects rotation of the first support in order to cause pivoting of the line guide from the second to the first position.

In the case of a reel in which the second support for the line guide is of generally cylindrical shape and has a slot limited on one side by an inclined ramp, and in which an abutment is arranged at the periphery of the first support, it is advantageous that the first support comprises a tubular element connected with a plate. The tubular support and plate are raised by a lifting dog carried by a rod rotatably connected with the control lever when the control lever is pivoted in the first direction in order to bring the corresponding end of the line guide past the abutment, so that the line guide by virtue of its inherent resilience is also caused to slide along the inclined ramp of the second support and is thus caused to pivot from the first to the second position.

The control lever is pivotable in a second direction and is also rotatably connected with a shaft provided with a stud for driving the stud in a second direction of rotation to drive a sleeve which carries a thrust abutment in order to rotate the plate of the first support, counter to resilient biasing means. The plate itself which carries the abutment for return of the line guide moves in such a manner that the rotation of the lever in the second direction causes the rotation of the first support and of its return abutment to return the line guide from the second to the first position.

BRIEF DESCRIPTION OF THE DRAWING

The invention is illustrated by way of example in the accompanying drawings.

FIG. 2 is a perspective view of an assembly of control means for pivoting the line guide of a casting reel.

Figure 1:
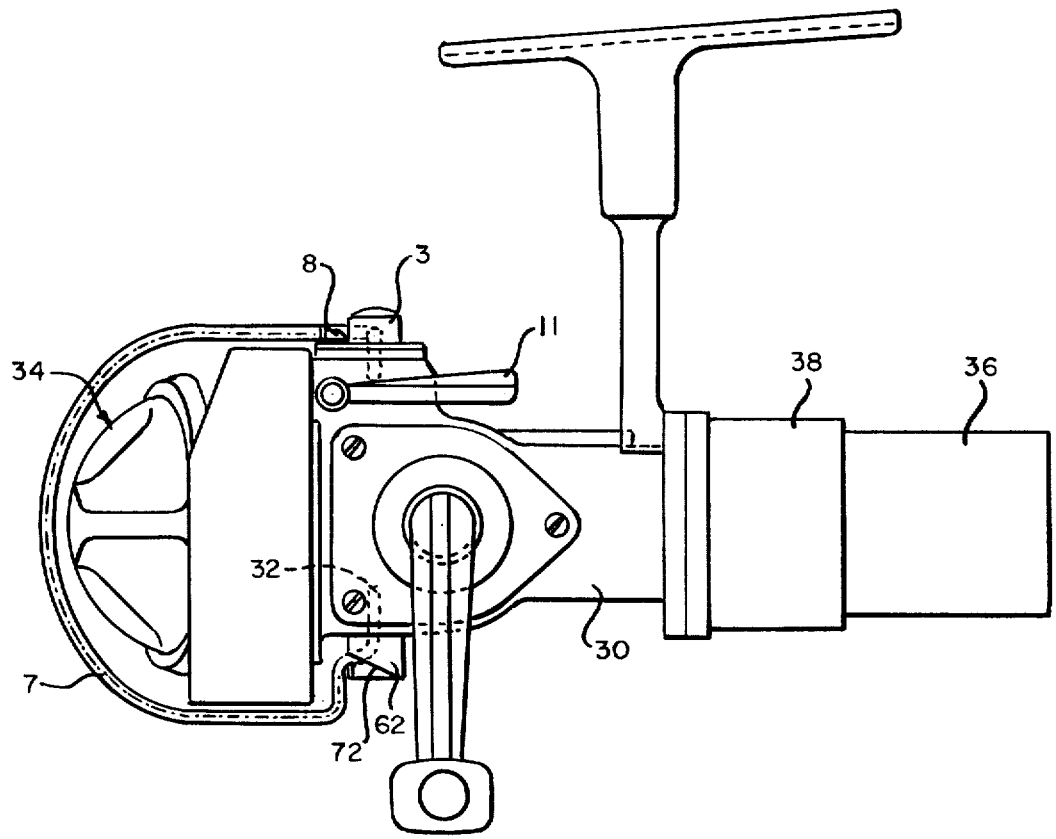
FIG. 1 is a side elevation of a casting reel.

In the drawing the control means are disposed in an associated casing which is shown in broken lines. The casing is fitted on the upper face of the body of a reel identical to that as described in my U.S. Pat. No. 4,108,392, the details of which will not therefore be described again, but are incorporated by reference for purposes of explanation.

DESCRIPTION OF THE PREFERRED EMBODIMENTS

In FIG. 1, there is shown a casting reel which is the same as the casting reel in my aforementioned U.S. Patent. The reel comprises a line guide 7 which is the same as line guide 58 of the aforementioned U.S. Patent, pivotable about an axis fixed relative to the body 30. Mounted at one portion of body 30 is a support 3 for one end of line guide 7 and mounted at another portion of body 30 is another support 62 fixed to body 30 for receiving the other end 32 of line guide 7. Drive is provided for spool 34 by means of a miniature electric motor 36 and a centrifugal clutch 38.

Referring now more particularly to FIG. 2, the casing 1 is shown in broken lines and is open at its upper part and is provided with a stem 2 by which it is received on the upper face of the body of the reel. A support 3 arranged in stem 2 and comprising a tubular element 4 is mounted for rotary and axial translatory movement in the casing 1, by way of its base 5. The support 3 also comprises a center part 6, into which the bentover end 8 of the line guide 7, penetrating into the tubular part of the support 3, comes into abutment.

The other end 32 of the line guide (as shown in FIG. 1) is received, as explained in the aforementioned patent, in a manner similar to line guide 58, in a second support, such as support 62 thereof, arranged on the opposite face of the body of the reel to that receiving the casing 1. The support which is the same as support 62 of the aforementioned patent has a generally cylindrical form or shape and comprises a slot opening over about a quarter of its circumference, such as slot 72, bounded on one side by an axial cut defining an axial edge and on the other by an edge cut defining an inclined ramp.

Owing to the inherent resilience of the line guide 7, the bent-over end 8 is permanently retained in the support 3 while the opposite end which passes through the slot of the second support, is constantly retained in the latter.

The tubular element 4 of the support 3 carries, at its upper part, a plate 9 in the form of a circular disc having a partly cut away portion 9a which in turn carries an abutment 10.

A single control lever 11 is provided to control the pivoting of the line guide 7. The single control lever 11 is pivoted in the casing 1 and is rotatably connected with a rod 12 which carries at its end a lifting dog 13 located under the plate 9. The lever 11 is also rotatably connected with a hollow shaft 14. The rod 12 penetrates the hollow shaft 14 and has a driving stud 15 which is received in a recess 16 arranged at the end of a sleeve 17. The rod 12 also penetrates the sleeve 17 which is journalled in the casing 1. The other end of the sleeve 17 carries an abutment 18 and a mounting 19. A thrust abutment 8 projects into the cut-away 9a in the plate 9. A rod 20 having one end 21 pivoted between mounting 19 and abutment 18 and its other end 22 extending from its connection between abutment 18 and mounting 19 and being capable of sliding outside of the casing 1. A compression spring 23 surrounds the rod 20 and proximate to the end 22 thereof engages with one end on the casing 1 and with its other end the spring engages upon an annular abutment 24 provided on the rod 20 proximate to the pivotal connection between abutment 18 and mounting 19. Lastly, an abutment 25 is arranged at the periphery of the plate 9 of the support 3, either on the casing 1 or on the body of the reel, and latches the line guide in the winding position, as shown in dot and dashed lines. Abutment 25 is formed as an inclined ramp extending over a sector of a circle.

DESCRIPTION OF THE OPERATION

A reel provided with means for pivoting the line guide as described heretofore operates in the following manner:

Assuming that the line is wound up and the line guide 7 is in its winding position, when the user of such a reel mounted on a fishing rod wishes to cast, then such user must simply catch the line with the index finger of the hand holding the rod, then push the control lever 11 in the direction of the arrow F1 with the back of this index finger. The rotation of the lever 11 in the direction F1 on the one hand drives the hollow shaft 14 and the driving stud 15 which stud moves within the recess 16 without driving the sleeve 17; and, on the other hand, the rotation of lever 11 in the direction F1 rotates the rod 12 and the lifting dog 13 in the direction of the arrow F1, which raises the plate 9, and thus also raises the support 3. The bent-over end 8 of the line guide 7 is thus brought past the abutment 25 on the periphery of the support 3, in such a manner that the line guide, by sliding along the inclined ramp which bounds the slot 72 of the other support 62 and acts as a torsion spring upon the end of the line guide so as to assure pivoting, as is described in the aforementioned United States patent and due to the inherent resilience of the line guide 7, pivots from the winding position (shown in the dot-dashed lines) to the casting position (shown in full lines in the attached drawing). The fisherman user can thus cast in the customary manner.

In order to enable winding in of the line, it is sufficient for the user to pull the lever 11 towards the fishing rod, then towards the user himself, in the direction of the arrow F2, with the index finger of the hand holding the rod. The rotation of the lever 11 on the one hand drives the rod 12 and the dog 13, without any effect upon the position of the support 3, and on the other hand rotates the shaft 14 and the driving stud 15 in the direction of the arrow F'2, and thus also rotates the sleeve 17.

The abutment 18 is rotated by the sleeve 17 and engages the partly cut-away portion 9a to effect the rotation of the plate 9 of the support 3 in the direction of the arrow F"2, counter to the compression spring 23 carried by the rod 20. The abutment 10 which is carried by the plate 9 thus returns the line guide 7 from the casting position to the winding position and latches the line guide 7 in the latter position (winding position) behind the peripheral abutment or ramp 25.

If the reel is motorized, the operation of the winding motor may advantageously be controlled by means of contacts responsive either to rotation of the sleeve 17 or to displacement of the rod 20.

If the reel is not motorized, winding can be effected manually by means of the crank of the reel. In both cases the spring 23 comprises a return spring for returning the control means to the initial position.

The reel according to the present invention thus effectively comprises an automatic reel allowing the user, with the aid of simplified control means, to fish conveniently, without risk of confusion between the movements or of difficulty in the holding of the fishing rod. The reel can thus be used in all types of fishing, both sporting and commercial, because it establishes a handling which is simple, effective, and versatile.

It will be obvious to those skilled in the art that various changes and modifications may be made without departing from the scope of the invention.

I claim:

1. In a fishing reel of the type described, said fishing reel having a body supporting a rotatable spool having an ejectable line thereon, a spool driving means, and a line guide pivoted about an axis fixed relative to the body and which is transverse to the direction of ejection of the line, a pair of line guide supports, said line guide having two ends, one of which is received by each of said supports, the improvement comprising:

a mechanical double monostable toggle switching means forming a single assembly including one of said supports and comprising means axially for axially shifting said one support for pivoting said line guide from a first position in which a line can be wound onto said spool to a second position in which the line is unwound from said spool during casting, and for pivoting said line guide from the second position to the first position; and said switching means including a single control lever coupled to said shifting means, said single control lever being rotatable in one direction for activating said means for shifting said one support to cause pivoting of said line guide from the first position to the second position, and said single control lever being rotatable in another direction opposite to said first direction for activating said means for axially shifting said one support to cause pivoting of the line guide from the second position to the first position, said line guide remaining in each of its said positions until its placement is changed by said single control lever.

2. In the fishing reel as claimed in claim 1, wherein said switching means includes a plate in the form of a disc a shaft rotatably coupled with said control lever, said shaft having a driving stud thereon;

a sleeve on said shaft having means engageable with said driving stud, said sleeve having a thrust abutment thereon for engagement with said plate;

said plate including a projecting abutment for the return of the line guide, and wherein rotation of said control lever in the second direction causes said driving stud to engage said sleeve to bring said thrust abutment into engagement with said plate for rotation thereof and said projecting abutment to return said line guide from said second position to said first position.

3. In the fishing reel as claimed in claim 2, in which a rod penetrates said shaft and said sleeve.

4. In the fishing reel as claimed in claim 1, wherein said one support is shiftable from one level to another level, and said shifting means includes:

a lifting dog operatively connected with said single control lever and said one support for shifting said one support from said one level to said other level in order to cause the pivoting of said line guide from the first position to the second position, and means operatively connected with said single control lever for rotating said one support from one position thereof to another position thereof to cause the pivoting of said line guide from the second position to the first position.

5. In the fishing reel as claimed in claim 1, wherein:

said switching means includes means for movement of said one support from one level to another level along a central axis thereof, and means for rotation of said one support about said central axis from one position thereof to another position thereof; and said axial shifting means includes first means cooperating with said single control lever to move said movement means to shift said one support axially in response to the movement of said single control lever in the one direction, and second means cooperating with said single control lever and said rotation means to rotate said one support in response to the movement of said single control lever in the other direction.

6. In the fishing reel as claimed in claim 1, wherein said shifting means comprises:
   a movable disc and means to move said disc rotationally and in a transverse direction thereto; and having an opening for receiving said one end of said line guide;
   a first abutment associated with the body of the reel, said first abutment having an inclined ramp surface;
   a second abutment carried by said disc and spaced from said first abutment to provide a free space between said first and second abutments for holding the line guide in the second position thereof;
   a rod having one end rotatably coupled to said control lever, and said other end of said rod having a lifting dog for shifting said disc in the transverse direction to raise the line guide over said first abutment for positioning between said first and said second abutments in response to movement of said control lever in the first direction; and
   a sleeve having one end coupled to said control lever, and a third abutment coupled with the other end of said sleeve engageable with said disc for rotation thereof in response to movement of said control lever in the second direction to cause said second abutment to engage said line guide for movement thereof along said inclined ramp surface of said first abutment to move the line guide to the first position.

7. In the fishing reel as claimed in claim 1, wherein: said shifting means includes:
   a ramp abutment arranged at the periphery of said one support, and wherein the other of the supports is of generally cylindrical shape and is provided with a slot bounded on one side by an inclined ramp over which the end of the line guide received in the other of said supports is adapted to slide by virtue of its inherent resilience; and
   said one of said supports includes:
   a plate in the form of a disc;
   a tubular element connected with said plate;
   a rod rotatably connected with said control lever;
   said rod having a lifting dog movable for engagement with said plate for lifting thereof, the rotation of said control lever in the first direction moving said lifting dog into engagement with said plate for lifting thereof thereby to bring the corresponding end of the line guide past said abutment, and thereby permitting the other end of said line guide to slide along the inclined ramp of said second support; and
   said guide pivoting from said first position to said second position after being moved past said abutment.

8. In the fishing reel as claimed in claim 1, including:
   an associated casing on an upper face of said body for housing of said switching means.

9. In a fishing reel as claimed in claim 1, wherein said single assembly includes:
   means to hold said line guide in the first position;
   said shifting means being responsive to said single control lever to move said line guide from said holding means for movement thereof into the second position.

* * * * *